Oct. 25, 1966  G. V. WOODLING  3,280,671
TEETH FOR GRIPPING JAWS
Filed Feb. 8, 1965
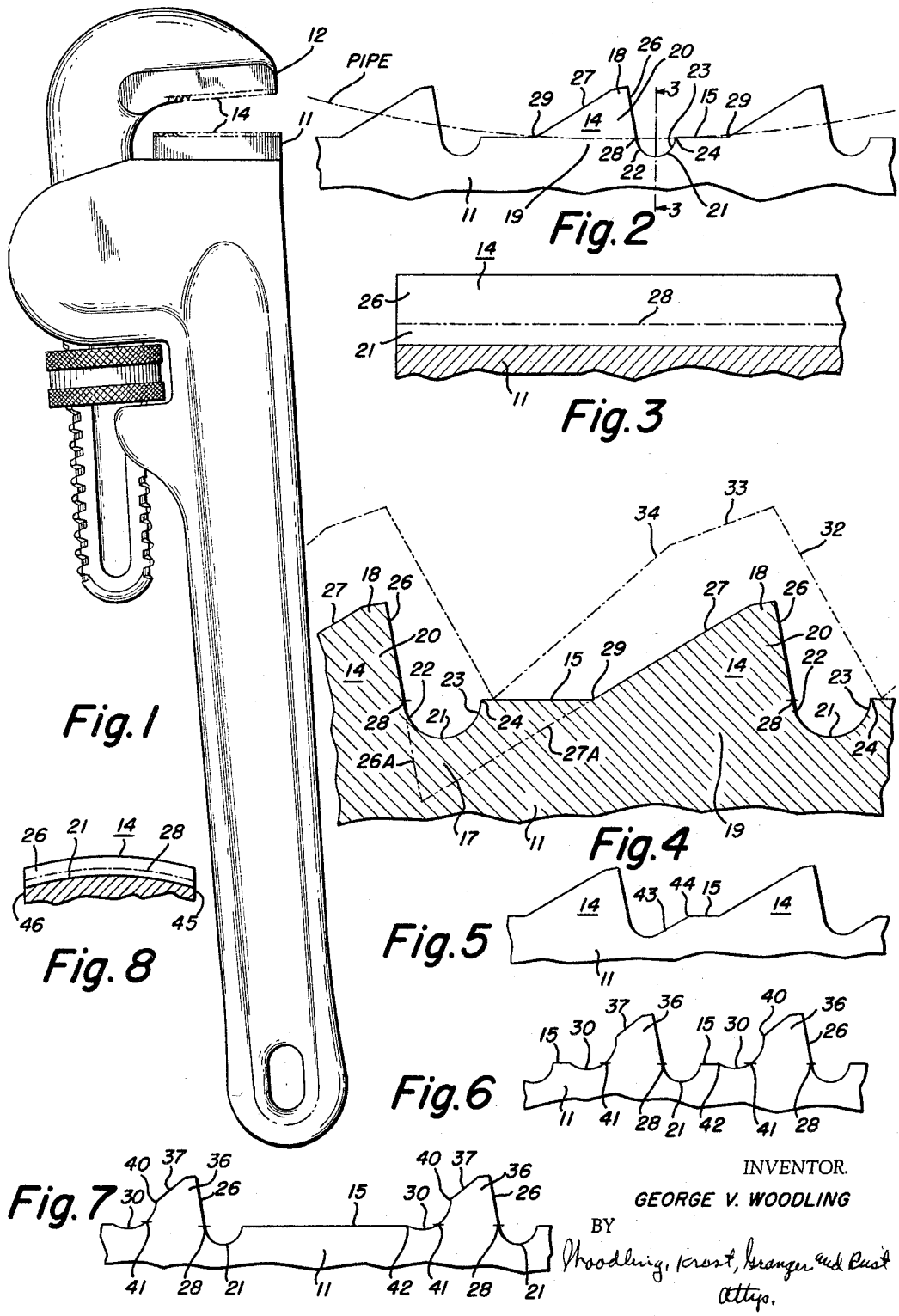
INVENTOR.
GEORGE V. WOODLING
BY
Woodling, Krost, Granger and Rust
Attys.

United States Patent Office 3,280,671
Patented Oct. 25, 1966

3,280,671
TEETH FOR GRIPPING JAWS
George V. Woodling, 22077 W. Lake Road,
Rocky River, Ohio 44116
Filed Feb. 8, 1965, Ser. No. 430,952
13 Claims. (Cl. 81—186)

My invention relates to improvements in teeth for gripping jaws and more particularly to improvements in teeth for pipe wrenches.

Although my invention will be described in conjunction with pipe wrenches, it is to be understood that it is applicable to all other devices having gripping jaws for gripping a pipe, such for example as pliers, vises, chain wrenches, etc. In this application, the term "pipe" is used in a generic sense and includes all objects having substantially an outer cylindrical wall, whether hollow or solid.

It is well known in the trade that the prior art teeth in pipe wrenches when gripping a pipe under the application of high torque tend to "chew" or "skin-off" the metal on the outer wall of a pipe, thereby weakening the gripping action. There is no well-defined word which can fully describe this "skinning-off" action produced by these prior art teeth. It may also be referred to as a "tearing" action or a "chewing" action. In any event, there is a force tending to drive the teeth into the metal. Also, the teeth tend to cut the metal and form chips. Furthermore, the virgin metal from which the chips are formed is free to flow (that is, free to be displaced) into the V-shaped valleys between the teeth during the formation of the chips. This freedom of the metal to flow into the V-shaped valleys is the source of the trouble leading to the "skinning-off" action.

An object of my invention is the provision of improved teeth for gripping jaws which block or arrest the freedom of the metal to flow, whereby preventing the formation of chips and producing a high gripping torque.

Another object is the provision of improved teeth for gripping jaws which block the free flow of the metal as chips are tending to be formed and which thereby preclude the formation of chips all together with the result that the metal which would have otherwise been in the form of chips remain solidly intact with the virgin metal of the outer wall of the pipe, thereby providing a solid grip engagement under the application of high torque.

Another object is the provision of improved teeth for gripping jaws which prevents or minimizes such "skinning-off" action by "nipping it in the bud" before the metal has a chance to be "skinned off."

Another object is the provision of improved teeth for gripping jaws which are small in cross-section as compared to the teeth in the prior art.

Another object is the provision of improved teeth for gripping jaws which because of their small cross-sectional area tend to bite easily into the outer wall of a pipe and make a "full-depth" penetration.

Another object is the provision of improved teeth for gripping jaws which support the metal that would otherwise have been "skinned off" by teeth in the prior art, thereby preventing the free flow of the metal and resultant formation of chips.

Another object is the provision of gripping teeth comprising spaced ridges between which the would-be-displaced metal is supported and locked against being sheared off.

Another object is the provision of a base filler for filling the V-shaped valleys between the teeth and thereby providing an upper surface constituting a pipe-support base wall extending generally in a direction lengthwise of the jaw member and bridging the V-shaped space between the teeth.

Another object is the provision of gripping teeth having a small cross-sectional area which make a "full-depth" penetration into the outer wall of the pipe, as opposed to the standard prior art teeth which have a large cross-sectional area and which make only a partial (tip) penetration in the outer wall of the pipe.

Another object is the provision of gripping teeth having a size about the same size as the tip portion only of the standard prior art teeth which make a partial penetration in the outer wall of the pipe.

Another object is the provision of a jaw face having a convex or arcuate contour.

Other objects and a fuller understanding of my invention may be had by referring to the following description and claims, taken in conjunction with the accompanying drawings, in which:

FIGURE 1 is a side view of a ten-inch pipe wrench drawn full size into which my improved teeth may be incorporated, the teeth being illustrated by a dash-dot line since they are too small to be fully drawn in life-size;

FIGURE 2 is an enlarged side view of my improved teeth on the handle-jaw of the pipe wrench, the view also showing the outer wall of a pipe in a dash-dot circle, the view being drawn approximately 18 times scale;

FIGURE 3 is a cross-sectional view, taken along the line 3—3 of FIGURE 2 (omitting the pipe) and illustrating a front face of my improved teeth including the metal-receiving recess;

FIGURE 4 is an enlarged cross-sectional side view of my improved teeth and showing how they are modified from teeth of prior standard practice, the latter being shown in dash-dot lines;

FIGURES 5, 6 and 7 show modifications in my improved teeth; and

FIGURE 8 is a modification of the jaw face.

With reference to the drawings, FIGURE 1 illustrates a pipe wrench into which my improved teeth may be incorporated. The wrench has a handle-jaw 11 and a hook-jaw 12 for gripping a pipe. FIGURE 2 shows an enlarged side view of my improved teeth on the handle-jaw. The improved teeth on the hook-jaw are the same as those for the handle-jaw, except that they are in reverse direction. The improved teeth extend transversely across their respective jaws. Preferably, both jaws are provided with my improved teeth, although in some cases, my improved teeth may be provided on only one of the jaws. Tests indicate that it is the hook-jaw which does most of the slipping and the "skinning off" of metal, and in the event only one jaw if provided with my improved teeth, the preference is to select the hook-jaw.

In the drawings, my improved teeth are identified by the reference character 14 and extend crosswise of the jaw member. They are spaced apart from each other in a direction lengthwise of the jaw members and define the pitch therebetween. Bridging the space between the teeth is a base filler 17 (see FIGURE 4). The base filler 17 has an upper surface constituting a pipe-support base wall extending between the teeth in a direction lengthwise of the jaw member.

The pipe-support base wall comprises a pipe-support surface 15 and a recess 21 having a surface defining a void to receive displaced metal of the pipe. The teeth 14 project upwardly from the pipe-support base wall and each has a front tooth face 26 and a rear tooth face 27. My teeth are modified from the standard practice of the prior art in that the normal V-shaped valleys between the teeth of the prior art are filled with the metal base filler 17, each having an upper surface constituting a bridge or pipe-support base wall between the teeth. In my invention, if the front tooth face 26 of one tooth and the rear tooth face 27 of an adjacent tooth were extended downwardly in their respective general directions below the pipe-support base wall, as illustrated by the dash-double dot lines 26A and 27A, they would intersect each other and define with said pipe-support base wall the base filler 17 (see FIGURE 4). The teeth have an uppermost elongated penetrating edge portion 18, a lowermost elongated root portion 19, and an intermediate elongated body portion 20 therebetween. The penetrating edge portion 18 and the body portion 20 constitute a pipe-penetrating portion disposed above the level of the pipe-support surface 15. The root portion 19 is disposed below the level of the pipe-support surface 15. Even though my teeth in FIGURES 1–5 are substantially one-half as large in cross-section as the standard teeth of the prior art, yet they are strong against being sheared off because the width of the body portion 20 as measured in a direction lengthwise of the jaw member, is greater than the height of the pipe-penetrating portion. Also my teeth penetrate the outer wall of the pipe for their "full-depth" and this "full-depth" penetration gives them added effective strength because the shear force is at a level close to the solid body of the jaw member. The teeth of the prior art do not penetrate to their "full-depth" and thus the shear force is at a level high up on the teeth (near the tip) away from being close to the solid body of the jaw member. My teeth with "full-depth" penetration and with the shear force, being close to the solid body of the jaw member, have less tendency to break off as do the teeth in the prior art.

In this application, the terms "above" and "below" the pipe-support surface and equivalent designations are used in a general sense and cover all situations regardless of the position of the jaw members, whether vertical, horizontal or upside-down.

The recess 21 has first and second sides 22 and 23 defining the width thereof as measured in a direction lengthwise of the jaw member. The first side 22 constitutes a front wall for the root portion 19 of a tooth. The second side 23 meets with the pipe-support surface 15 and defines a metal-blocking corner 24 therewith. The front tooth face 26 constitutes a pressure-exerting wall extending from the penetrating edge portion 18 to the first side 22 of the recess 21 where it makes a front base juncture 28 therewith. The front face 26 may be approximately at an angle of ten degrees from the vertical. The rear face 27 constitutes a pressure relief wall and extends from the edge portion 18 to the pipe-support surface 15 where it makes a rear base juncture 29 therewith. The rear face 27 may be approximately at an angle of 30 degrees from the horizontal thereby making an included angle with the front face 26 at approximately 70 degrees. The top surface of the edge portion 18 may be approximately at an angle of 10 degrees from the horizontal. For a ten-inch pipe wrench, other sizes being in approximately the same relative proportions, the pitch between two adjacent teeth may be approximately .110 inch. The width of the body portion 20 between the front and rear base junctures 28 and 29 as measured in a direction lengthwise of the jaw member may be approximately .050 inch and is substantially equal to about one-half of the pitch between the teeth. The height of the pipe-penetrating portion above the pipe-support surface 15 may be approximately .025 inch, which is substantially equal to about one-half the width of the body portion 20 of a tooth between the front and rear base junctures 28 and 29 as measured in a direction lengthwise of the jaw member. The width and depth (diameter) of the recess 21 may be approximately .020 inch. The uppermost surface of the edge portion 18 may be approximately .008 inch. The length of the pipe-support surface 15 may be approximately .030 inch. All the above dimensions may be varied a few thousandths (plus or minus .005 to .010 inch).

The pipe-support surface 15 and the recess 21 are a continuation of each other and constitute the pipe-support base wall. The recess 21 is considered to be part of the pipe-support base wall because the surface of the recess after it is once filled with displaced metal actually supports the would-be-displaced metal against being further sheared off. In FIGURES 1–5, the combined length of the pipe-support surface 15 and the recess 21 as measured in a direction lengthwise of the jaw member is greater than the height of the effective penetrating portion of a tooth above the pipe-support surface 15. With the combined construction of my pipe-support surface 15 and the recess 21, the V-shaped valleys which exist between teeth of the prior art are prefilled by the nature of my construction and thus in my invention there is substantially no place, except the intended recess 21, into which would-be-displaced metal can flow when the pipe wrench is under a state of the application of high torque.

In my invention the would-be-displaced metal of the pipe is supported against shearing. Thus the total circumferential shear force on the metal of the pipe effectively extends from one tooth-tip to the next and for a ten-inch pipe wrench, for example, this distance being approximately .110 inch, is more than sufficient to resist circumferential shearing ("skinning-off") of the supported metal of the pipe with "full-depth" penetration. This is a new concept. In FIGURE 2, which is drawn substantially to 18 times scale, the pipe (dash-dot line) is shown as a perfect circle, but in actual practice, the pipe would be slightly flattened where it is squeezed between the jaws and thus it would lay substantially flat against the pipe-support surface 15 and be supported all the way therealong against shearing.

FIGURE 4 shows a comparison in size between my teeth (shown in section for emphasis) and the standard teeth of a prior art ten-inch pipe wrench, the latter being shown by dash-dot lines 32, 33 and 34. In a prior art ten-inch standard pipe wrench, the pitch between adjacent teeth is approximately .110 inch, the same as that for my invention; the height of the teeth is approximately .050 inch, which is substantially two times the height of my teeth; the front face 32 is approximately at an angle of 20 degrees from the vertical; and the compound rear faces 33 and 34 are approximately at an angle of 70 and 50 degrees, respectively, from the vertical.

In my invention, the pipe-support surface 15 is substantially tangent to the circumference of the pipe and the pitch is related to the height of a tooth (pipe-penetrating portion) above the level of the pipe-support surface 15. The pitch may reside in a range of approximately 3 to 6 times the height of the pipe-penetrating portion of a tooth above the level of the pipe-support surface 15. If the pitch is too short relative to the height of the pipe-penetrating portion, the metal of the pipe may tend to shear circumferentially (not having enough circumferential body distance to withstand the shear force). If the pitch is too long, the tangent effect of the pipe (departure of pipe from the tangent) may limit the effective number of teeth engaging the pipe. In FIGURES 1–5, the combined length of the pipe-support surface 15 and the metal-receiving recess 21 as measured in a direction lengthwise of the jaw member is substantially the same as the width of the body portion 20 of a tooth between the front and rear base junctures 28 and 29 as measured in a direction lengthwise of the jaw member and affords ample opportunity for the outer wall of the pipe to be supported thereby against shearing. The height of the pipe-penetrating portion is less than the width of the body portion 20 of a tooth between the front and rear base junctures 28 and 29 as measured in a direction lengthwise of the body member and is more than the depth of the metal-receiving recess 21. Thus, the cross-sectional area of the pipe-penetrating portion of my teeth above the level of the pipe-support surface 15 is greater than the cross-sectional area of the recess 21.

The pipe-penetrating portion of my teeth is considerably smaller in cross-section (substantially one-half) than that of the standard teeth of the prior art. Thus, my improved teeth readily penetrate the outer wall of the pipe to their "full-depth" when the pipe wrench is operated, whereas the standard teeth rarely ever penetrate the outer wall of the pipe to their "full-depth." For a standard ten-inch pipe wrench of the prior art, the teeth usually penetrate the outer wall of the pipe to a depth of approximately .025 inch with the result that the metal of the outer wall of the pipe under the application of high torque is free to flow down into the unfilled V-shaped valleys between the teeth of the prior art, thereby readily producing chips which weaken the gripping torque. Thus, in the prior art teeth, there is no support (such as the pipe-support surface 15 in my invention) to block the flow of metal. Consequently, the outer wall of the pipe easily "skins off" since the unsupported metal is free to flow into the unfilled V-shaped valleys between the teeth of the prior art.

It is to be noted that my teeth, even though they are about one-half as large as the standard teeth of the prior art, make substantially the same amount of penetration into the pipe because they penetrate to their "full-depth," whereas the standard prior art teeth do not. Generally, it may be noted that my teeth have a size about the same as that of the tip portion only of the standard prior art teeth which makes a partial penetration in the outer wall of the pipe. There is this vital difference between my invention and the prior art in that the gripping power of my teeth, with about the same amount of penetration, is many times greater than that of the standard prior art teeth since in my invention the would-be-displaced metal is supported and has no place except the intended recess 21 in which to flow as it does in the unfilled valleys of the prior art teeth.

The amount of the "fill" between the teeth in my invention may be expressed in terms of the width of the pipe-support base wall between the front base juncture of a tooth and the rear base juncture of a next adjacent tooth as measured in a direction lengthwise of the jaw member. Generally, the width of the pipe-support base wall comprising both the width of the pipe-support surface 15 and the width of the recess 21 as measured in a direction lengthwise of the jaw member may vary in a range from approximately one to four times the base width of a tooth. The main function of the "fill" is to insure that the pipe-support base wall supports and locks the would-be-displaced metal of the pipe against being sheared off.

In my invention, the pipe-penetrating portion, being small in cross-section, may readily penetrate the outer wall of the pipe for making a "full-depth" gripping indenture therein. In making the indenture, the pipe-penetrating portion causes displaced metal to flow therefrom into the metal-receiving recess 21. The displaced metal usually "throws up" an advanced edge (not necessarily loose chips but more in the nature of a burred edge) and it is this advanced burred edge which flows into the recess 21. The principal function of the recess is to provide a void into which the advanced burred edge of the displaced metal may flow so that the pipe-support surface 15 may directly contact the outer wall of the pipe without interference. Thus, the pipe-support surface 15 between the improved teeth may make direct engagement with the outer wall of the pipe without the advanced burred edge of the displaced metal interfering with the direct engagement, as would be the case if there were no recess or its equivalent to receive the advanced edge. The pipe-support surface 15 upon making direct engagement with the outer wall of the pipe, limits the depth of the indenture by arresting the extent to which the pipe-penetrating portion may bite into the outer wall of the pipe. The pipe-support surface 15 upon making the direct engagement with the outer wall of the pipe blocks the flow of metal (advanced burred edge) out of the recess past the metal-blocking corner 24 and at the same time supports the outer wall of the pipe, whereby after the recess 21 is filled with displaced metal, the further flow of would-be-displaced metal from the outer wall of the pipe under pressure from the front face 26 of the body portion 20 is arrested from being sheared off the outer wall of the pipe, thereby effecting a high gripping torque.

The recess may have a form or shape other than that of a semicircle as shown in FIGURES 1–4 of the drawings. For example, the side 23 of the recess need not necessarily be a segment of a circle but may be a line 43, see FIGURE 5, extending generally upwardly from the bottom of the recess at an incline to a point 44 where it meets with the pipe-support surface 15. The point 44 thus becomes a metal-blocking corner. The teeth in FIGURE 5 may be the same as those shown in FIGURES 1 and 4. In all forms of my invention, the teeth comprise spaced ridges between which the would-be-displaced metal is supported and locked against being sheared off.

In FIGURE 6, the reference character 36 shows a modification in my improved teeth, in that the rear face 37 and the pipe-support surface 15 at the location of the rear base juncture define a metal-receiving pocket 30 for receiving any possible chips or displaced metal (advanced burred edge) that may tend to flow thereinto.

The surface of the pocket 30 is drawn on a radius of approximately .015 inch. The upper end of the surface of the pocket 30 meets with the rear face 37 at an intersection 40 which is approximately .012 inch above the level of the pipe-support surface 15. The rear face 37 is at approximately 37 degrees from the horizontal. The low point of the pocket 30 is approximately .003–.005 inch below the level of the pipe-support surface 15. The width of the modified teeth at the level of the intersection 40 is approximately .020 inch. The surface of the pocket 30 at the level of the pipe-support surface 15 makes a rear base juncture 41 at the rear of the teeth. It also makes an intersection 42 with the pipe-support surface 15. The pipe-support base wall extends from the front base juncture 28 at the front of one tooth to the rear base juncture 41 at the rear of a next adjacent tooth and may be approximately .045 inch. At the level of the pipe-support surface 15, the base width of the teeth between the front and rear junctures 28 and 41 thereof in FIGURE 6 is approximately .030 inch which is about the same as the height (.025 inch) of the penetrating portion of the teeth. The teeth in FIGURE 6, being relatively narrow with respect to the height readily make a "full-depth" penetration under a state of the application of high torque. As previously mentioned the combined length (width) of the pipe-support base wall may vary in a range from approximately one to four times the base width of a tooth. In FIGURES 2, 4 and 5, the combined length is approximately one times the base width of a tooth. In FIGURE 6, the combined length is approximately 1.5 times the base width of a tooth. In FIGURE 7, the combined length is approximately four times the base width of a tooth, otherwise the FIGURES 6 and 7 are substantially the same. Also as previously pointed out, the pitch may vary in a range from approximately three to six times the height of the pipe-penetrating portion of a tooth above the level of the pipe-support surface 15. In FIGURES 2, 4 and 5, the pitch is approximately four times the height. In FIGURE 6, the pitch is approximately three times the height. In FIGURE 7, the pitch is approximately six times the height.

It is amazing how my improved teeth give superior performance over standard teeth of the prior art. The gripping torque is greater with little or no "skinning off" of the metal from the outer wall of the pipe. The bite or grip seems to be more solid. My improved teeth easily penetrate the outer wall of the pipe to their "full depth." Also the improved teeth, even though their cross-section is considerably smaller than that of the standard teeth of the prior art, show no tendency to break off under the pressure of high torque. In short, less damage is done to the outer wall of the pipe and at the same time the gripping torque is greater.

As shown in FIGURE 8, my jaw face may comprise an arcuate or convex contour as well as a flat contour. The jaw face is defined by the pipe-support base wall and the teeth projecting therefrom. The jaw face has side edges 45 and 46 which are laterally spaced apart from each other and define the width thereof. The convex contour is in a direction crosswise of the jaw face and comprises substantially a cylindrical segment which makes a maximum tooth penetration in the central region intermediate said side edges and a minimum tooth penetration in the side regions near said side edges. With a convex contour, the length of a tooth penetration in a direction crosswise of the jaw face is short for light torque applications and long for heavy torque applications. Thus, the heavier the torque application, the greater the length of the tooth penetration. The grip increases as the torque increases. Preferably, the arc of the convex contour is such that the pipe-support base wall in the region intermediate the side edges is approximately on the same level as the upper penetrating tooth edge portions in the region near the side edges. The terms arcuate or convex are used in a generic sense in this application and they comprise all forms wherein the length of the tooth penetration increases as the application of the torque is increased. The convex contour may be applied to the handle-jaw alone or to the hook-jaw alone or to both jaws.

The present disclosure includes that contained in the appended claims, as well as that of the foregoing description.

Although this invention has been described in its perferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. In a device having at least a jaw member for gripping a pipe, the improvement of teeth extending in a direction crosswise of said jaw member, said teeth respectively having a front tooth face and a rear tooth face and being spaced from each other in a direction lengthwise of said jaw member and defining the pitch therebetween, a base filler disposed between a front tooth face of one tooth and a rear tooth face of a next adjacent tooth and extending crosswise of said jaw member, said base filler having an upper surface constituting a pipe-support base wall, a front tooth face of one tooth and a rear tooth face of a next adjacent tooth if extended downwardly in their respective general directions below said pipe-support base wall would intersect each other and define a valley having front and rear valley wall faces with said valley wall faces defining with said pipe-support base wall said base filler, said pipe-support base wall bridging the valley between said teeth, said teeth projecting upwardly from said pipe-support base wall and each having a front tooth face and a rear tooth face, said teeth having an uppermost penetrating edge portion, a lowermost root portion and an intermediate body portion, said penetrating edge portion and said body portion constituting a pipe-penetrating portion disposed above said pipe-support base wall, said front tooth face constituting a pressure exerting wall extending downwardly from said penetrating edge portion to said pipe-support base wall where it makes a front base juncture therewith, said rear tooth face constituting a pressure relief wall extending downwardly from said penetrating edge portion to said pipe-support base wall where it makes a rear base juncture therewith, said pipe-support base wall having a portion thereof exposing a front valley wall face below said front base juncture and constituting a front valley wall face of said root portion, said pipe-penetrating portion being disposed to be forced into the outer wall of the pipe for making a gripping indenture therein whereby said pipe-support base wall between said teeth may make direct engagement with the outer wall of the pipe, said pipe-support base wall upon making said direct engagement limiting the depth of said indenture by arresting the extent to which said pipe penetrating portion may bite into the outer wall of the pipe, said pipe-support base wall upon making said direct engagement with the outer wall of the pipe supporting same and thereby blocking the flow of would-be-displaced metal therefrom, said pipe-support base wall includes a metal-receiving recess at said front base juncture.

2. In a device having at least a jaw member for gripping a pipe, the improvement of teeth extending in a direction crosswise of said jaw member, said teeth respectively having a front tooth face and a rear tooth face and being spaced from each other in a direction lengthwise of said jaw member and defining the pitch therebetween, a base filler disposed between a front tooth face of one tooth and a rear tooth face of a next adjacent tooth and extending crosswise of said jaw member, said base filler having an upper surface constituting a pipe-support base wall, a front tooth face of one tooth and a rear tooth face of a next adjacent tooth if extended downwardly in their respective general directions below said pipe-support base wall would intersect each other and define a valley having front and rear valley wall faces with said valley wall faces defining with said pipe-support base wall said base filler, said pipe-support base wall bridging the valley between said teeth, said teeth projecting upwardly from said pipe-support base wall and each having a front tooth face and a rear tooth face, said teeth having an uppermost penetrating edge portion, a lowermost root portion and an intermediate body portion, said penetrating edge portion and said body portion constituting a pipe-penetrating portion disposed above said pipe-support base wall, said front tooth face constituting a pressure exerting wall extending downwardly from said penetrating edge portion to said pipe-support base wall where it makes a front base juncture therewith, said rear tooth face constituting a pressure relief wall extending downwardly from said penetrating edge portion to said pipe-support base wall where it makes a rear base juncture therewith, said pipe-support base wall having a portion thereof exposing a front valley wall face below said front base juncture and constituting a front valley wall face of said root portion, said pipe-penetrating portion being disposed to be forced into the outer wall of the pipe for making a gripping indenture therein whereby said pipe-support base wall between said teeth may make direct engagement with the outer wall of the pipe, said pipe-support base wall upon making said direct engagement limiting the depth of said indenture by arresting the extent to which said pipe penetrating portion may bite into the outer wall of the pipe, said pipe-support base wall upon making said direct engagement with the outer wall of the pipe supporting same and thereby blocking the flow of would-be-displaced metal therefrom, said pipe-support base wall includes a metal-receiving pocket at said rear base juncture.

3. In a device having at least a jaw member for gripping a pipe, the improvement of teeth extending in a direction crosswise of said jaw member, said teeth respectively having a front tooth face and a rear tooth face and being spaced from each other in a direction lengthwise of said jaw member and defining the pitch therebetween, a base filler disposed between a front tooth face of one tooth and a rear tooth face of a next adjacent tooth and extending crosswise of said jaw member, said base filler having an upper surface constituting a pipe-support base wall, a front tooth face of one tooth and a rear tooth face of a next adjacent tooth if extended downwardly in their respective general directions below said 3,280,671 pipe-support base wall would intersect each other and define a valley having front and rear valley wall faces with said valley wall faces defining with said pipe-support base wall said base filler, said pipe-support base wall bridging the valley between said teeth, said teeth projecting upwardly from said pipe-support base wall and each having a front tooth face and a rear tooth face, said teeth having an uppermost penetrating edge portion, a lowermost root portion and an intermediate body portion, said penetrating edge portion and said body portion constituting a pipe-penetrating portion disposed above said pipe-support base wall, said front tooth face constituting a pressure exerting wall extending downwardly from said penetrating edge portion to said pipe-support base wall where it makes a front base juncture therewith, said rear tooth face constituting a pressure relief wall extending downwardly from said penetrating edge portion to said pipe-support base wall where it makes a rear base juncture therewith, said pipe-support base wall having a portion thereof exposing a front valley wall face below said front base juncture and constituting a front valley wall face of said root portion, said pipe-penetrating portion being disposed to be forced into the outer wall of the pipe for making a gripping indenture therein whereby said pipe-support base wall between said teeth may make direct engagement with the outer wall of the pipe, said pipe-support base wall upon making said direct engagement limiting the depth of said indenture by arresting the extent to which said pipe penetrating portion may bite into the outer wall of the pipe, said pipe-support base wall upon making said direct engagement with the outer wall of the pipe supporting same and thereby blocking the flow of would-be-displaced metal therefrom, said teeth have a pitch therebetween residing in a range of approximately 3 to 6 times the height of said pipe-penetrating portion.

4. In a device having at least a jaw member for gripping a pipe, the improvement of teeth extending in a direction crosswise of said jaw member, said teeth respectively having a front tooth face and a rear tooth face and being spaced from each other in a direction lengthwise of said jaw member and defining the pitch therebetween, a base filler disposed between a front tooth face of one tooth and a rear tooth face of a next adjacent tooth and extending crosswise of said jaw member, said base filler having an upper surface constituting a pipe-support base wall, a front tooth face of one tooth and a rear tooth face of a next adjacent tooth if extended downwardly in their respective general directions below said pipe-support base wall would intersect each other and define a valley having front and rear valley wall faces with said valley wall faces defining with said pipe-support base wall said base filler, said pipe-support base wall bridging the valley between said teeth, said teeth projecting upwardly from said pipe-support base wall and each having a front tooth face and a rear tooth face, said teeth having an uppermost penetrating edge portion, a lowermost root portion and an intermediate body portion, said penetrating edge portion and said body portion constituting a pipe-penetrating portion disposed above said pipe-support base wall, said front tooth face constituting a pressure exerting wall extending downwardly from said penetrating edge portion to said pipe-support base wall where it makes a front base juncture therewith, said rear tooth face constituting a pressure relief wall extending downwardly from said penetrating edge portion to said pipe-support base wall where it makes a rear base juncture therewith, said pipe-support base wall having a portion thereof exposing a front valley wall face below said front base juncture and constituting a front valley wall face of said root portion, said pipe-penetrating portion being disposed to be forced into the outer wall of the pipe for making a gripping indenture therein whereby said pipe-support base wall between said teeth may make direct engagement with the outer wall of the pipe, said pipe-support base wall upon making said direct engagement limiting the depth of said indenture by arresting the extent to which said pipe penetrating portion may bite into the outer wall of the pipe, said pipe-support base wall upon making said direct engagement with the outer wall of the pipe supporting same and thereby blocking the flow of would-be-displaced metal therefrom, said pipe-support base wall includes a metal-receiving recess and a pipe-support surface, said recess having a cross-sectional area less than that of a tooth above said pipe support surface.

5. In a device having at least a jaw member for gripping a pipe, the improvement of teeth extending in a direction crosswise of said jaw member, said teeth respectively having a front tooth face and a rear tooth face and being spaced from each other in a direction lengthwise of said jaw member and defining the pitch therebetween, a base filler disposed between a front tooth face of one tooth and a rear tooth face of a next adjacent tooth and extending crosswise of said jaw member, said base filler having an upper surface constituting a pipe-support base wall, a front tooth face of one tooth and a rear tooth face of a next adjacent tooth if extended downwardly in their respective general directions below said pipe-support base wall would intersect each other and define a valley having front and rear valley wall faces with said valley wall faces defining with said pipe-support base wall said base filler, said pipe-support base wall bridging the valley between said teeth, said teeth projecting upwardly from said pipe-support base wall and each having a front tooth face and a rear tooth face, said teeth having an uppermost penetrating edge portion, a lowermost root portion and an intermediate body portion, said penetrating edge portion and said body portion constituting a pipe-penetrating portion disposed above said pipe-support base wall, said front tooth face constituting a pressure exerting wall extending downwardly from said penetrating edge portion to said pipe-support base wall where it makes a front base juncture therewith, said rear tooth face constituting a pressure relief wall extending downwardly from said penetrating edge portion to said pipe-support base wall where it makes a rear base juncture therewith, said pipe-support base wall having a portion thereof exposing a front valley wall face below said front base juncture and constituting a front valley wall face of said root portion, said pipe-penetrating portion being disposed to be forced into the outer wall of the pipe for making a gripping indenture therein whereby said pipe-support base wall between said teeth may make direct engagement with the outer wall of the pipe, said pipe-support base wall upon making said direct engagement limiting the depth of said indenture by arresting the extent to which said pipe penetrating portion may bite into the outer wall of the pipe, said pipe-support base wall upon making said direct engagement with the outer wall of the pipe supporting same and thereby blocking the flow of would-be-displaced metal therefrom, the pipe-penetrating portion of a tooth has a penetrating height less than the width of the body portion of a tooth between the front and rear base junctures thereof as measured in a direction lengthwise of said jaw member.

6. In a device having at least a jaw member for gripping a pipe, the improvement of teeth extending in a direction crosswise of said jaw member, said teeth respectively having a front tooth face and a rear tooth face and being spaced from each other in a direction lengthwise of said jaw member and defining the pitch therebetween, a base filler disposed between a front tooth face of one tooth and a rear tooth face of a next adjacent tooth and extending crosswise of said jaw member, said base filler having an upper surface constituting a pipe-support base wall, a front tooth face of one tooth and a rear tooth face of a next adjacent tooth if extended downwardly in their respective general directions below said pipe-support base wall would intersect each other and define a valley having front and rear valley wall faces with said valley wall faces defining with said pipe-support base wall said base filler, said pipe-support base wall bridging the valley between said teeth, said teeth projecting upwardly from said pipe-support base wall and each having a front tooth face and a rear tooth face, said teeth having an uppermost penetrating edge portion, a lowermost root portion and an intermediate body portion, said penetrating edge portion and said body portion constituting a pipe-penetrating portion disposed above said pipe-support base wall, said front tooth face constituting a pressure exerting wall extending downwardly from said penetrating edge portion to said pipe-support base wall where it makes a front base juncture therewith, said rear tooth face constituting a pressure relief wall extending downwardly from said penetrating edge portion to said pipe-support base wall where it makes a rear base juncture therewith, said pipe-support base wall having a portion thereof exposing a front valley wall face below said front base juncture and constituting a front valley wall face of said root portion, said pipe-penetrating portion being disposed to be forced into the outer wall of the pipe for making a gripping indenture therein whereby said pipe-support base wall between said teeth may make direct engagement with the outer wall of the pipe, said pipe-support base wall upon making said direct engagement limiting the depth of said indenture by arresting the extent to which said pipe penetrating portion may bite into the outer wall of the pipe, said pipe-support base wall upon making said direct engagement with the outer wall of the pipe supporting same and thereby blocking the flow of would-be-displaced metal therefrom, said teeth have a pitch therebetween residing in a range of approximately 3 to 6 times the penetrating height of said pipe-penetrating portion, said pipe-penetrating portion having a penetrating height about the same as the width of said body portion between the front and rear base junctures thereof as measured in a direction lengthwise of said jaw member.

7. In a device having at least a jaw member for gripping a pipe, the improvement of teeth extending in a direction crosswise of said jaw member, said teeth being spaced from each other in a direction lengthwise of said jaw member and defining the pitch therebetween, a base filler extending crosswise of said jaw member, said base filler having an upper surface constituting a pipe-support base wall extending generally in a direction lengthwise of said jaw member and bridging the space between said teeth, said teeth projecting upwardly from said pipe-support base wall and each having a front tooth face and a rear tooth face, a front tooth face of one tooth and a rear tooth face of a next adjacent tooth if extended downwardly in their respective general directions below said pipe-support base wall would intersect each other and define with said pipe-support base wall said base filler, said teeth having an uppermost penetrating edge portion, a lowermost root portion and an intermediate body portion, said penetrating edge portion and said body portion constituting a pipe-penetrating portion disposed above said pipe-support base wall, said pipe-support base wall having a pipe-support surface and a metal-receiving recess having a surface defining a void to receive displaced metal of the pipe, said recess having first and second sides defining the width thereof as measured in a direction lengthwise of said jaw member and said pipe-support surface having first and second edges defining the width thereof as measured in a direction lengthwise of said jaw member, said first side of said recess constituting a front wall of said root portion and said second side of said recess meeting with said first edge of said pipe-support surface and defining a metal-blocking corner therewith, said front tooth face constituting a pressure exerting wall extending downwardly from said penetrating edge portion to said first side of said recess where it makes a front base juncture therewith, said rear tooth face constituting a pressure relief wall extending downwardly from said penetrating edge portion to said second edge of said pipe-support surface where it makes a rear base juncture therewith, said pipe-penetrating portion being disposed to be forced into the outer wall of the pipe for making a gripping indenture therein, said pipe-penetrating portion in making said indenture causing displaced metal to flow therefrom into said metal-receiving recess whereby said pipe-support surface between said teeth may make a direct engagement with said outer wall of said pipe without displaced metal interfering with the making of said direct engagement, said pipe-support surface upon making said direct engagement limiting the depth of said indenture by arresting the extent to which said pipe-penetrating portion may bite into said outer wall of said pipe, said pipe-support surface upon making said direct engagement blocking the flow of metal out of said recess past said metal blocking corner and at the same time supporting said outer wall of said pipe whereby after said recess is filled with displaced metal the further flow of would-be-displaced metal from said outer wall of said pipe under pressure from said front tooth face of said body portion is arrested from being sheared off said outer wall of said pipe, thereby effecting a high gripping torque.

8. The structure as claimed in claim 7 wherein said pipe-support base wall includes a metal-receiving pocket at said rear base juncture.

9. The structure as claimed in claim 7 wherein the width of the pipe-support base wall between a rear base juncture of one tooth and a front base juncture of a next adjacent tooth may reside in a range from approximately one to four times the width of the body portion of a tooth between the front and rear base junctures thereof.

10. The structure as claimed in claim 7 wherein said teeth have a pitch therebetween residing in a range of approximately three to six times the height of said pipe-penetrating portion.

11. In a device having at least a jaw member for gripping a pipe, the improvement of teeth extending in a direction crosswise of said jaw member, said teeth being spaced from each other in a direction lengthwise of said jaw member and defining the pitch therebetween, a base filler extending crosswise of said jaw member, said base filler having an upper surface constituting a pipe-support base wall extending generally in a direction lengthwise of said jaw member bridging the space between said teeth, said teeth projecting upwardly from said pipe support base wall and each having a front tooth face and a rear tooth face, a front tooth face of one tooth and a rear tooth face of a next adjacent tooth if extended downwardly in their respective general directions below said pipe-support base wall would intersect each other and define with said pipe-support base wall said base filler, said teeth having an uppermost penetrating edge portion, a lowermost root portion and an intermediate body portion, said penetrating edge portion and said body portion constituting a pipe-penetrating portion disposed above said pipe-support base wall, said teeth having a pitch therebetween residing in a range of approximately three to six times the height of said pipe-penetrating portion, said front tooth face constituting a pressure exerting wall extending from said penetrating edge portion to said pipe-support base wall where it makes a front base juncture therewith, said rear tooth face constituting a pressure relief wall extending from said penetrating edge portion to said pipe-support base wall where it makes a rear base juncture therewith, said pipe-penetrating portion being disposed to be forced into the outer wall of the pipe for making a gripping indenture therein whereby said pipe-support base wall between said teeth may make direct engagement with the outer wall of the pipe, said pipe-support base wall upon making said direct engagement limiting the depth of said indenture by arresting the extent to which said pipe-penetrating portion may bite into the outer wall of the pipe, said pipe-support base wall upon making said direct engagement with the outer wall of the pipe supporting same and thereby blocking the flow of would-be-displaced metal therefrom, whereby a high gripping torque is provided.

12. The structure as claimed in claim 11 whereby said pipe-support base wall and said teeth constitute a jaw face having side edges spaced laterally apart from each other and defining the width thereof, said jaw face in a direction crosswise thereof defining a convex contour comprising substantially a cylindrical segment for making maximum tooth penetration in the central region intermediate said side edges and minimum tooth penetration in the side regions near said side edges.

13. The structure as claimed in claim 11 whereby said pipe-support base wall and said teeth constitute a jaw face having side edges spaced laterally apart from each other and defining the width thereof, said jaw face in a direction crosswise thereof defining a convex contour comprising substantially a cylindrical segment for making maximum tooth penetration in the central region intermediate said side edges and minimum tooth penetration in the side regions near said side edges, and whereby the pipe-support base wall in the central region intermediate said side edges is approximately on the same level as the upper penetrating tooth edge portions in the side regions near said side edges.

References Cited by the Examiner

UNITED STATES PATENTS

| | | |
|---|---|---|
| 440,564 | 11/1890 | Hammond. |
| 3,124,023 | 3/1964 | Marquis et al. _____ 81—186 |
| 3,188,894 | 6/1965 | Matsuoka _____ 81—101 |

WILLIAM FELDMAN, *Primary Examiner.*

MILTON S. MEHR, *Examiner.*